UNITED STATES PATENT OFFICE.

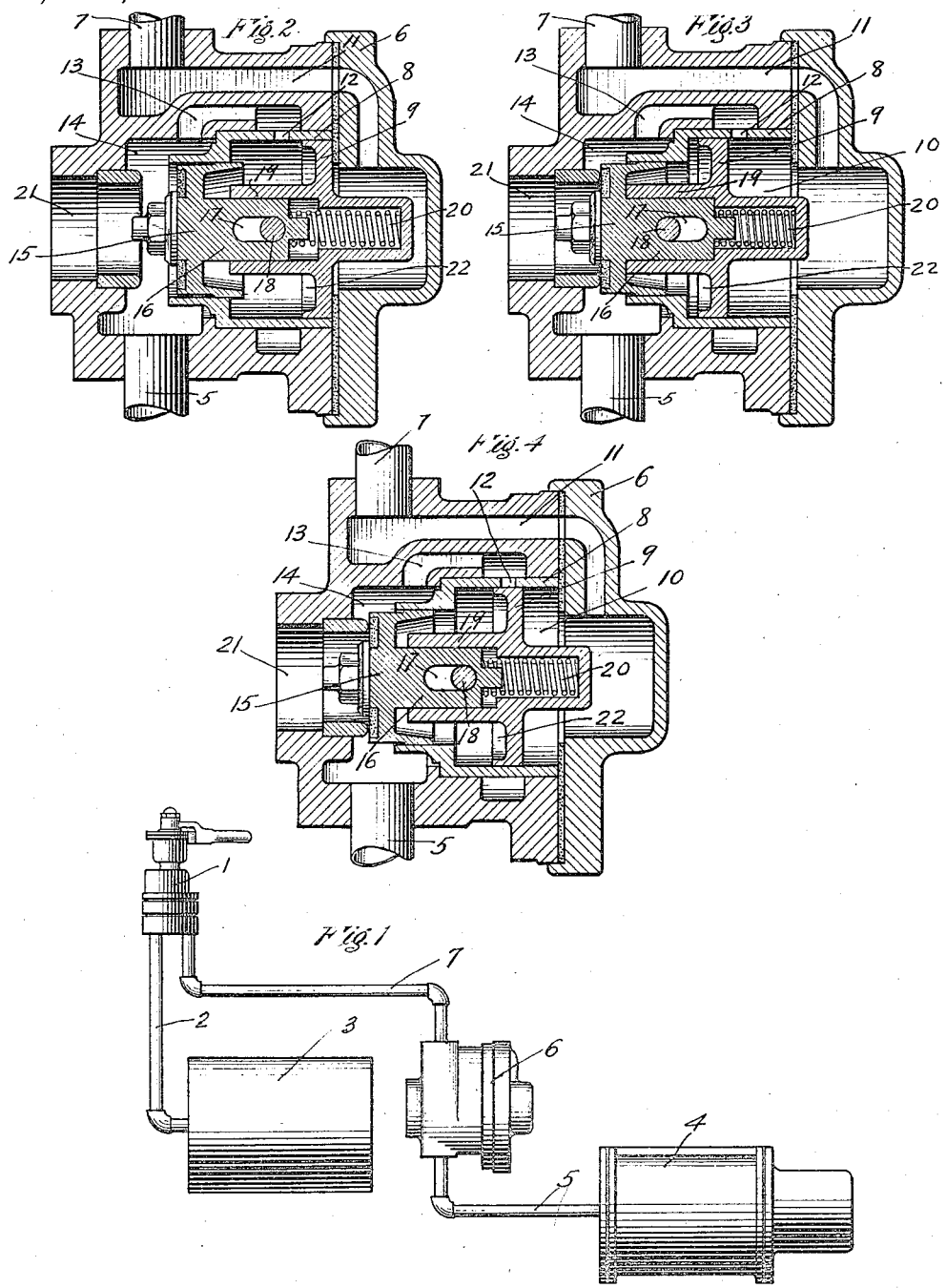

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

QUICK-RELEASE VALVE.

1,169,303.            Specification of Letters Patent.       Patented Jan. 25, 1916.

Application filed March 6, 1914. Serial No. 822,845.

*To all whom it may concern:*

Be it known that I, WALTER V. TURNER, a citizen of the United States, residing at Edgewood, in the county of Allegheny and State of Pennsylvania, have invented new and useful Improvements in Quick-Release Valves, of which the following is a specification.

This invention relates to release valves, and more particularly to a valve for effecting the quick release of fluid from a cylinder.

In many cases, in the operation of fluid pressure brakes or other fluid controlled mechanism, it is highly desirable to effect the release of fluid as quickly as possible.

For this purpose large ports could be provided in the operating valve, but this would necessitate the employment of a cumbersome, heavy, and expensive valve structure.

The principal object of my invention is to provide a quick release valve device having large ports for releasing fluid from the operating cylinder, so that a small and compact operating valve can be employed for controlling the admission and release of fluid under pressure to and from the cylinder.

Another object of my invention is to provide a quick release valve device adapted to close communication from the cylinder to the controlling valve upon supplying fluid to the cylinder, so that in releasing, the release valve device is operated by merely venting fluid from the small volume at one side of the valve device.

In the accompanying drawing; Figure 1 is a diagrammatic view of an apparatus for supplying and releasing fluid to and from a brake cylinder, with the improved quick release valve device applied thereto; Fig. 2 a central sectional view of the quick release valve device, showing the parts in normal release position; Fig. 3 a similar view, showing the parts in application position; and Fig. 4 a similar view, showing the parts in lap position.

As shown in Fig. 1, the equipment may comprise a controlling valve 1 connected by pipe 2 to a supply reservoir 3, an operating or brake cylinder 4 connected by pipe 5 to the quick release valve device 6, said valve device being connected to the operating valve 1 by pipe 7.

The release valve device 7 may comprise a casing having a chamber containing a bushing 8 within which is mounted a piston 9.

The chamber 10 at one side of the piston 9 is connected by a passage 11 with pipe 7 and a port or ports 12 in the bushing 8 lead from said chamber to a passage 13 which communicates with a chamber 14 open to pipe 5.

A valve 15 having a cylindrical body snugly fits in a reduced section of the bushing 8 and is provided with a stem 16 having a slot 17 for a pin 18 secured to the stem 19 of the piston 9, so that the valve may be operated by the piston while permitting a certain amount of lost motion. A spring 20 is mounted in a recess in the piston 9 and acts on the valve stem 16. The valve 15 controls a large atmospheric exhaust port 21 which opens to the chamber 14 when the valve is in open position.

Normally, the parts are in the positions shown in Fig. 2 of the drawing, with the valve 15 open and the piston 9 in its outermost position. If it is desired to supply fluid to the cylinder 4, the handle of the operating valve 1 is turned to application position and fluid is supplied from pipe 2 through the valve 1 to pipe 7 and thence through passage 11 to chamber 10 in the release valve device. The pressure of fluid on the outer face of piston 9 then operates to shift the piston inwardly to the position shown in Fig. 3, causing the valve 15 to seat and close the exhaust port 21 and at the same time uncovering the port 12, so that communication is established from chamber 10 to passage 13. Fluid can then flow to chamber 14 and thence through pipe 5 to the cylinder 4. When the operating valve handle is moved to lap position, the fluid pressure equalizes into chamber 22 between the piston 9 and the release valve 15 by leakage around the piston and the valve body and the spring 20 then returns the piston 9 to lap position, as shown in Fig. 4 of the drawing. The release valve 15 will be held seated, since the outer area is open to atmospheric pressure while the inner face is subject to the pressure supplied to cylinder 4. If it is desired to increase the cylinder pressure, the operating valve handle is again placed in application position and the fluid supplied to chamber 10 is then only required to move the piston 9 against the resistance of spring 20 to uncover the ports 12 in the bushing.

When it is desired to release fluid from cylinder 4, the operating valve handle is turned to release position and fluid is vented through the operating valve from chamber 10. Since the piston 9 is in lap position, the ports 12 are closed and consequently the small volume of fluid in chamber 10 is quickly vented to the atmosphere. The outer faces of the valve 15 and the piston 9 are now at atmospheric pressure and since the valve 15 is of less area than the piston 9, the fluid pressure in chamber 22 acts on the differential area of the piston 9 to shift the piston 9 outwardly and thereby lift the release valve 15 from its seat. The large exhaust port 21 is thus opened to the chamber 14 and fluid in the cylinder 4 is quickly vented to the atmosphere.

The construction above described can be used in connection with a straight air brake equipment or in industrial service where it is desired to quickly release fluid from a receptacle.

Having now described my invention, what I claim as new and desire to secure by Letters Patent, is:—

1. The combination with a cylinder and a valve for controlling the admission and release of fluid to and from the cylinder, of a quick release valve device comprising a piston open on one side to the controlling valve and operated by the flow of fluid from said controlling valve for opening communication for supplying fluid to the cylinder, a direct exhaust valve having a piston head of less area than the piston and adapted to be actuated by said piston, the piston having a movement relative to said valve, means for equalizing the fluid pressures on opposite sides of said piston, and a spring for moving said piston to close said communication upon equalization of pressures.

2. A quick release valve device comprising a collapsible piston having differential piston heads and carrying a release valve and operated by fluid supplied to one side for opening a supply communication and closing said valve, said communication being closed by movement of one piston head relative to the other upon equalization of fluid pressures and said exhaust valve being opened by further movement of the piston head upon the release of fluid from one side thereof.

3. The combination with a receptacle and a valve for controlling the admission and release of fluid to and from said receptacle, of a quick release valve device comprising a collapsible piston having differential piston heads and carrying a release valve, said valve device being operated by flow of fluid from the controlling valve for closing said exhaust valve and opening communication to said receptacle, means for equalizing the fluid pressure in the space intermediate the piston heads, and a spring for moving one piston head relatively to the other for closing said communication.

4. The combination with a receptacle and a valve for controlling the admission and release of fluid to and from said receptacle, of a quick release valve device comprising a collapsible piston having a small piston head provided with a release valve for directly releasing fluid from said receptacle and a large piston head operated by the flow of fluid from said controlling valve for moving said small piston head to close the exhaust valve and for opening communication for supplying fluid to said receptacle, means for equalizing the fluid pressure in the space between the piston heads, and a spring for moving the large piston head to close said communication.

In testimony whereof I have hereunto set my hand.

WALTER V. TURNER.

Witnesses:
A. M. CLEMENTS,
S. W. KEEFER.